United States Patent Office 2,989,565
Patented June 20, 1961

---

2,989,565
PURIFICATION OF KETENE
Raymond Perren, Allschwil, and Wolfgang Moser, Visp, Switzerland, assignors to Lonza Electric and Chemical Works Ltd., Basel, Switzerland
No Drawing. Filed Aug. 4, 1958, Ser. No. 753,091
Claims priority, application Switzerland Aug. 5, 1957
1 Claim. (Cl. 260—585.5)

The invention relates to the preparation of pure ketene.

Ketene may be prepared by the catalytic pyrolysis of acetic acid at subatmospheric pressure and at temperatures of 650 to 800° C. The thus obtained gaseous ketene is separated from unreacted acetic acid and the split-off water by quenching to temperatures of about —10° C. Subsequently the ketene gas is compressed by means of a blower or compressor to a pressure suitable for further processing.

In order to obtain high yields of ketene, it is necessary to accomplish the removal of the water and acetic acid rapidly and completely at reduced pressure. However, it has been found that in the recited procedure said compounds cannot be completely removed because water and acetic acid have at —10° C. still a considerable vapor pressure so that their partial pressure in the gas mixture is relatively high. With respect to the processing of the ketene, it is desirable for economic reasons to obtain the ketene in a state as pure as possible. However, a further drying by cooling the reaction gas to temperatures below —10° C. is extremely difficult because the precipitated mixture of water and acetic acid freezes and clogs the cooling devices, and requires very large cooling surfaces.

It is a principal object of the invention to provide a simple and economic method to prepare ketene substantially free of water and acetic acid, which method obviates the above recited difficulties.

Other objects and advantages will be apparent from a consideration of the specification and claims.

We have found that ketene gas, which has been freed from water and acetic acid by the conventional cooling procedure set forth above, can be further purified by washing with acetic anhydride, provided that such washing step is carried out at a pressure not exceeding 200 Torr. At said low pressure, substantially no dimerization of the ketene takes place; this fact is quite unexpected in view of the well known dimerization of ketene when dissolved in acetic anhydride at normal pressures.

The method of the invention is carried out as follows: The gas mixture leaving the cracking unit, which mixture consists essentially of ketene, water vapor, and acetic acid, is cooled in several steps under reduced pressure to condense the major part of the water and acetic acid. The gaseous ketene, which then contains still small amounts of water and acetic acid, is introduced into a washing unit where it is washed with acetic anhydride at a pressure of at most 200, preferably 80 to 120 Torr. The water and acetic acid washed out with acetic anhydride react in the washer with also dissolved ketene to acetic anhydride. For economic reasons, the operating temperature in the washer is maintained below —10° C., preferably in the range of —20 to —40° C.

The acetic anhydride formed in the washing step is withdrawn and utilized.

The ketene thus obtained is substantially free of water and acetic acid and can be processed in conventional conveying and compressing apparatus.

The following example is given to illustrate the method of the invention more in detail.

In an acetic acid cracking tube heated at 720° C., there are introduced 100 kg. of acetic acid per hour at a pressure of 100 Torr. The acetic acid contains .35 percent of triethyl phosphate as catalyst. Into the cracked gases, which contain, in addition to ketene, water vapor and some undecomposed acetic acid, a small amount of ammonia is introduced in order to prevent the reversion to acetic acid.

The gases are cooled in a first water-cooled cooler to 20° C. and in a second brine-cooled cooler to —10° C., whereby the major part of the water and unreacted acetic acid is precipitated. The combined condensates of both coolers yield about 35 kg. per hour of a 34% acetic acid.

Subsequently, the pre-purified ketene gases are washed in an absorber operated also at 100 Torr at —30° C. with acetic anhydride. Hereby, the residual water and acetic acid are substantially completely removed. In the absorber, 4.8 kg./hour of acetic anhydride are formed. Only after leaving said absorber, the pre- and after-purified gaseous ketene is passed into a compressor to increase the pressure to normal pressure. There are obtained 53.5 kg. per hour of gaseous ketene, which is substantially completely free of water and acetic acid. The yield, calculated on the cracked acetic acid, is 92.5 percent. The term "Torr," as used hereinabove, designates mm. Hg.

We claim:
1. A method of purifying ketene obtained at reduced pressure by the pyrolysis of acetic acid vapor in the presence of a catalyst comprising removing from the pyrolysis gases the major part of water and acetic acid contained therein by cooling to a temperature not below —10° C., washing said cooled gases at a temperature below —10° C. to about —40° C., at a pressure not exceeding 200 mm. Hg with acetic anhydride, thereby absorbing residual water and acetic acid, and subsequently compressing the thus obtained substantially pure ketene.

References Cited in the file of this patent
UNITED STATES PATENTS

| | | |
|---|---|---|
| 2,108,829 | Sixt et al. | Feb. 22, 1938 |
| 2,806,064 | McKlveen | Sept. 10, 1957 |
| 2,816,143 | Probst | Dec. 10, 1957 |